United States Patent [19]
Herron

[11] Patent Number: 5,471,057
[45] Date of Patent: Nov. 28, 1995

[54] METHOD AND APPARATUS FOR DETERMINING ELEMENTAL CONCENTRATIONS FOR γ RAY SPECTROSCOPY TOOLS

[75] Inventor: Susan L. Herron, Ridgefield, Conn.

[73] Assignee: Schlumberger Technology Corporation, Ridgefield, Conn.

[21] Appl. No.: 303,903

[22] Filed: Sep. 9, 1994

[51] Int. Cl.⁶ ................................................ G01V 5/10
[52] U.S. Cl. ................................. 250/269.6; 250/265
[58] Field of Search ........................... 250/269.6, 261, 250/265, 256, 390.01, 390.04

[56] References Cited

U.S. PATENT DOCUMENTS

| | | |
|---|---|---|
| 3,521,064 | 7/1970 | Moran et al. . |
| 3,976,878 | 8/1976 | Chevalier et al. . |
| 4,055,763 | 10/1977 | Antkiw . |
| 4,317,993 | 3/1982 | Hertzog, Jr. et al. . |
| 4,464,569 | 8/1984 | Flaum . |
| 4,810,876 | 3/1989 | Wraight et al. . |
| 5,097,123 | 3/1992 | Grau et al. . |

OTHER PUBLICATIONS

Hertzog R. et al. Geochemical logging with spectrometry tools. *Tech. Symp. Soc. Petroleum Engineers*, Dallas, SPW16792 (1987).

Grau J. A. and Schweitzer J. S. Elemental concentrations from thermal neutron capture gamma-ray spectra in geological formations. *Nucl. Geophys.* vol. 3, No. 1, 1–9 (1989).
Schweitzer J. S. et al. Elemental concentrations from Gamma-ray spectroscopy logs. *Nucl. Geophys.* vol. 2, No. 3, 175–181 (1988).

Primary Examiner—Davis L. Willis
Assistant Examiner—Richard Hanig
Attorney, Agent, or Firm—Martin D. Hyden; Leonard W. Pojunas

[57] ABSTRACT

A method for determining the elemental concentrations in an underground formation by irradiating the formation with neutrons, detecting the γ ray spectrum arising from neutron capture by the formation and analyzing the spectrum to determine elemental concentrations. This method avoids the need for activation measurements or natural radiation measurements and which is made possible by modifying the detected yield of iron (Fe) in the spectrum to compensate for the absence of aluminum (Al) and for the absence of potassium (K) when not measured directly. Apparatus for performing this method can comprise a neutron source, such as a broad energy chemical source, e.g. AmBe, or a pulsed accelerator source, a γ ray detector for detecting capture γ rays and means for analyzing the spectra detected by the detector for determining the elemental concentrations in the formation. This apparatus does not require an activation source nor does it require natural radiation or activation detectors and analysis circuitry.

23 Claims, 11 Drawing Sheets

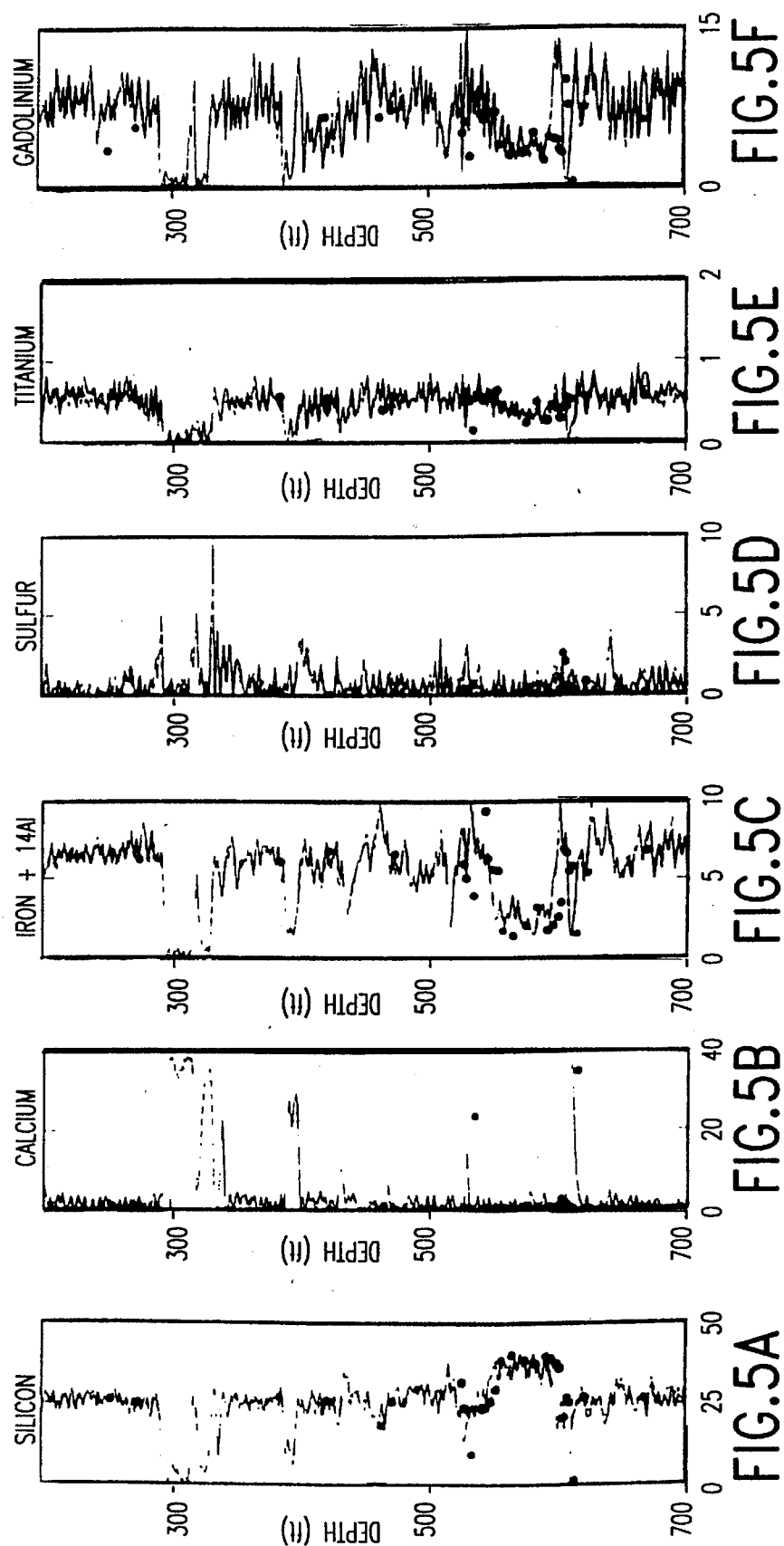

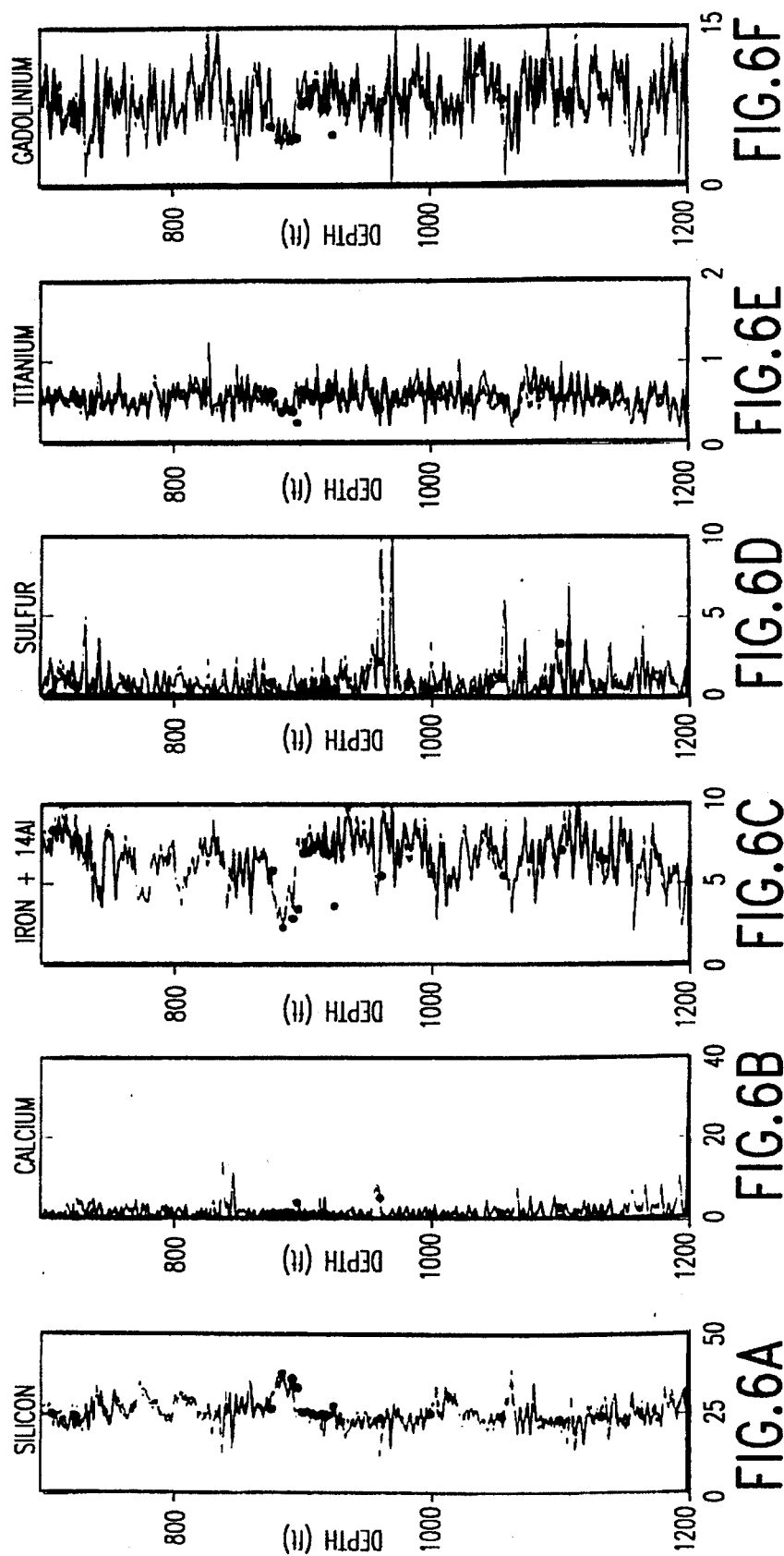

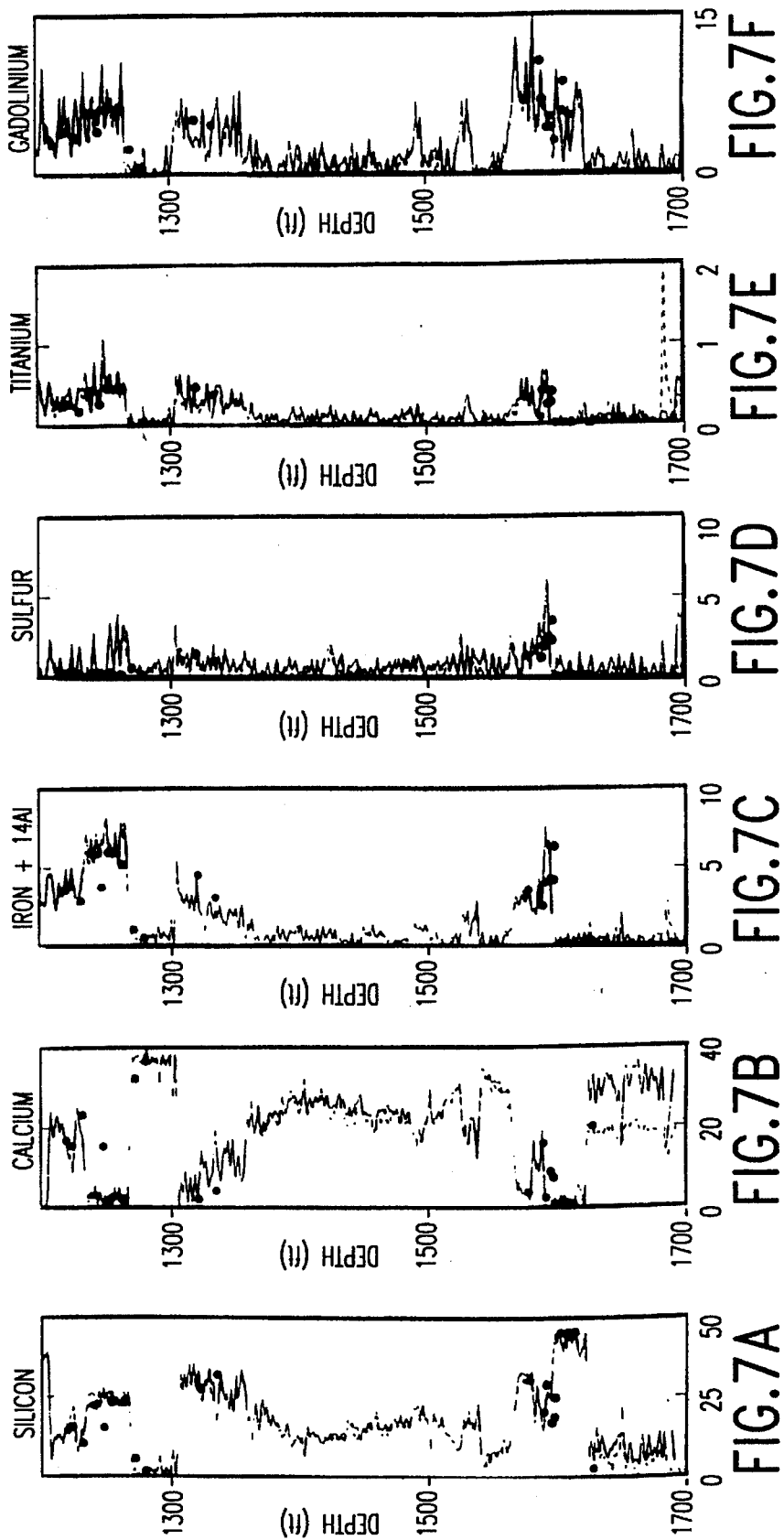

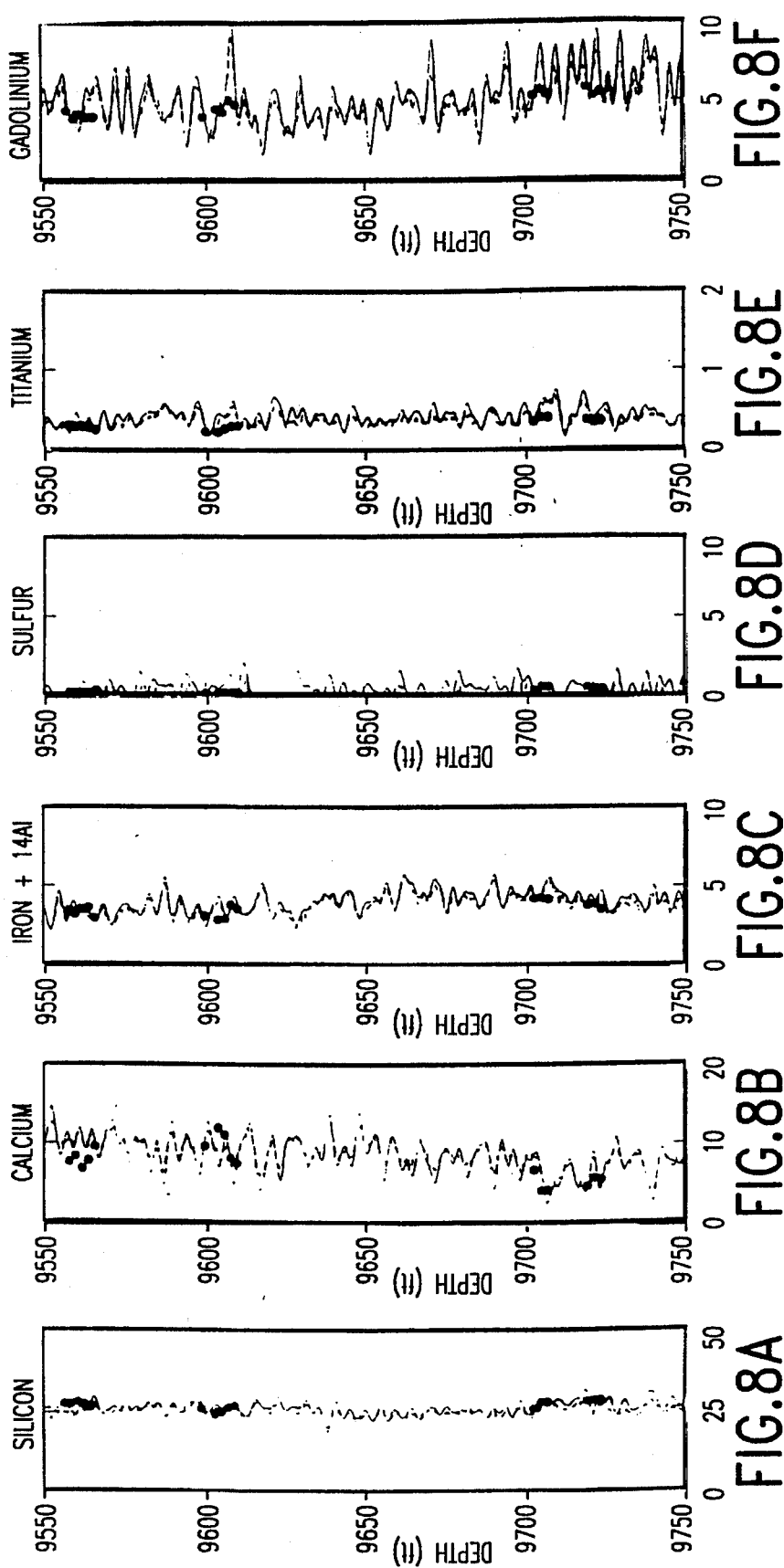

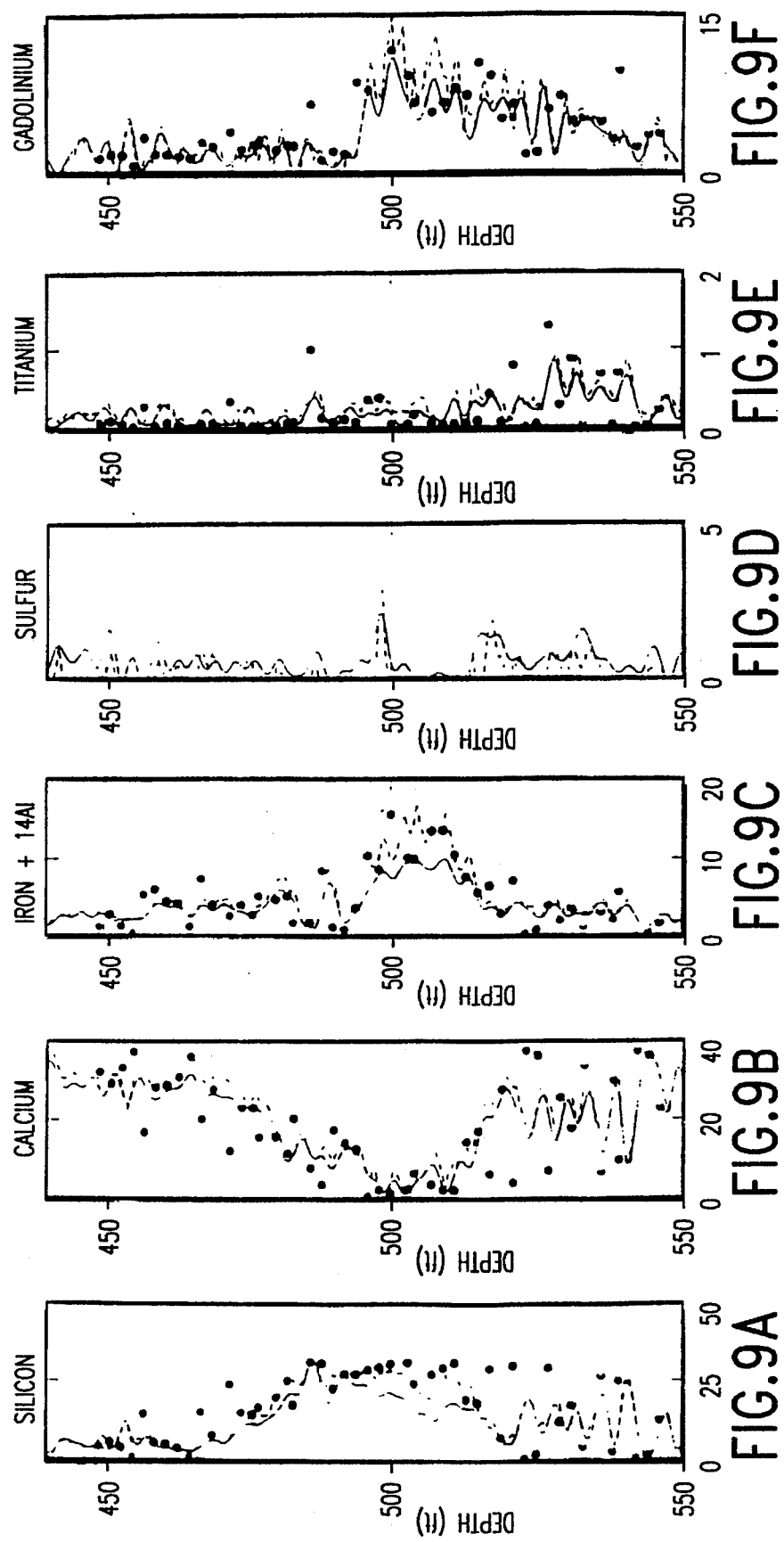

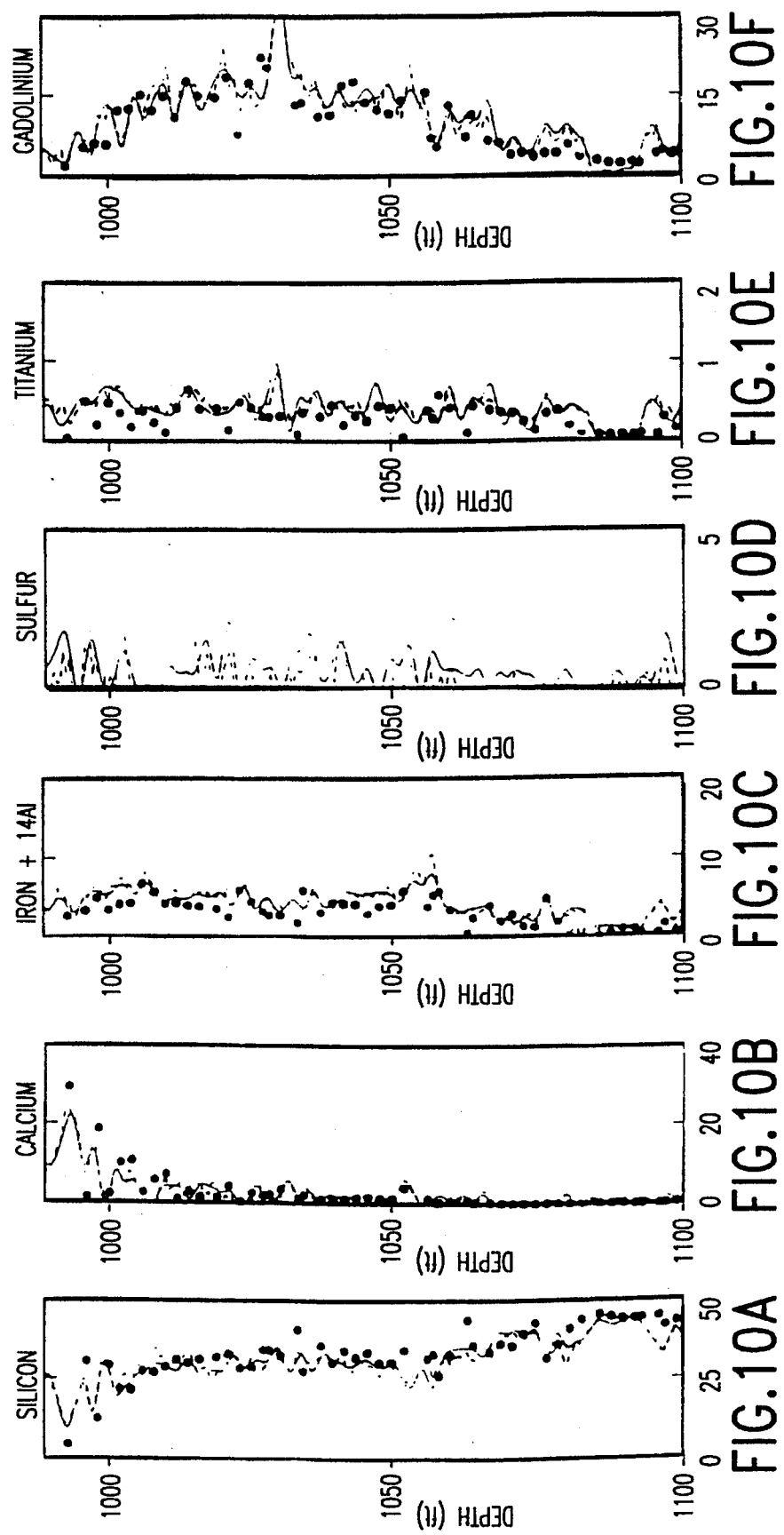

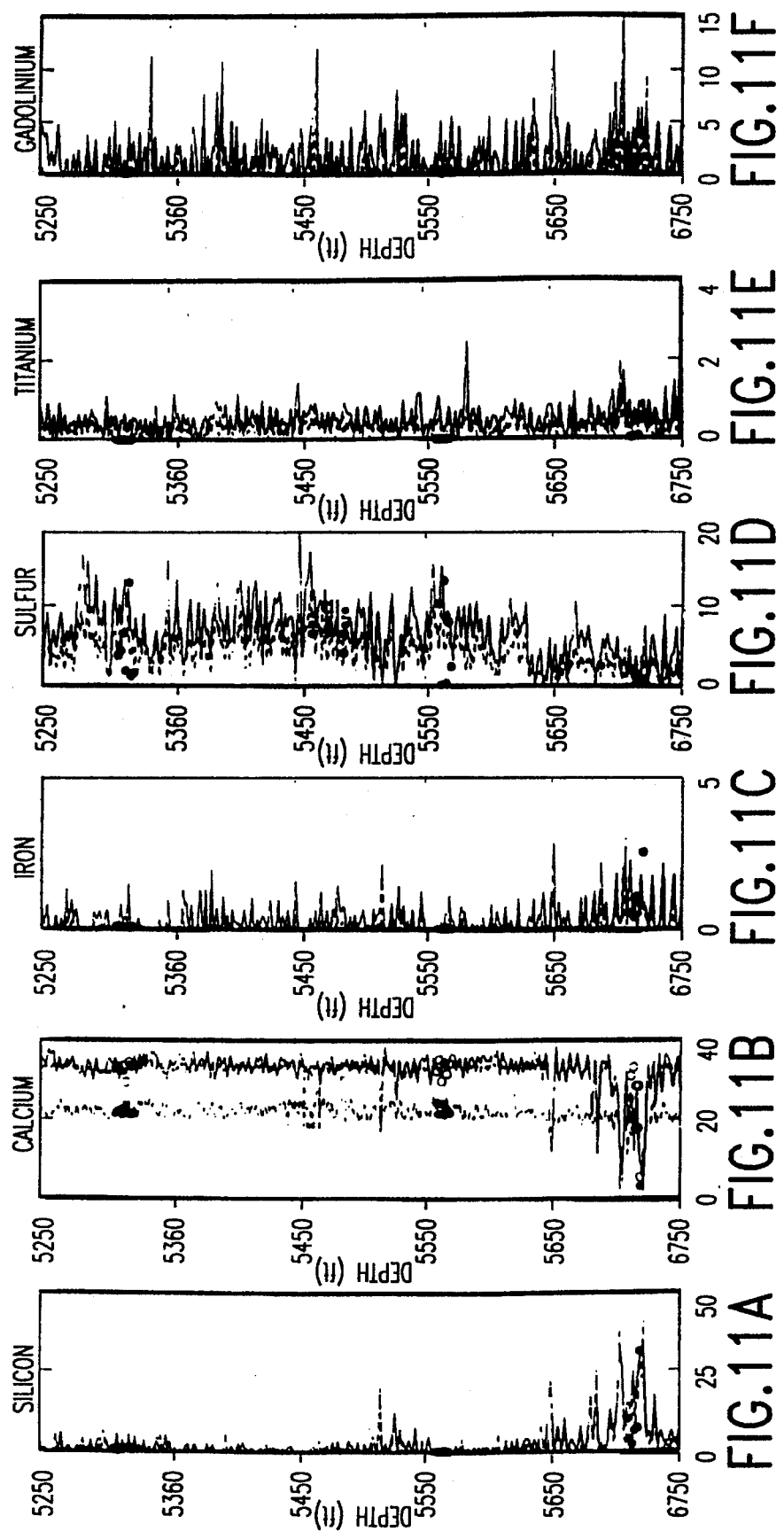

METHOD AND APPARATUS FOR DETERMINING ELEMENTAL CONCENTRATIONS FOR γ RAY SPECTROSCOPY TOOLS

The present invention relates to the determination of elemental concentrations in underground formations from γ ray spectroscopy logs. In particular, the invention provides a method for obtaining such information from capture γ ray spectra.

BACKGROUND OF THE INVENTION

Various methods have been proposed previously for obtaining elemental concentrations in underground formations using neutron irradiation of the formation and measurement of the γ rays resulting therefrom. Examples of such methods are found in U.S. Pat. No. 4,464,569, U.S. Pat. No. 4,810,876 and U.S. Pat. No. 5,097,123 (all incorporated herein by reference). In U.S. Pat. No. 4,464,569 a wireline logging tool incorporating a 14 MeV pulsed neutron source is used to irradiate an underground formation and the resulting capture γ rays from the formation are detected and a spectrum obtained. The spectra are analyzed to obtain relative elemental yields indicative of various elements in the formation. The tool is calibrated against known formation compositions and the relative yields are interpreted as the volume fractions of certain components of the formation. Calibration is required because only a relative measurement is obtained, not an absolute one, there is no removal of borehole or fluid-filled porosity effects and there is no correction for elemental sensitivities. U.S. Pat. No. 4,810,876 describes a method and apparatus for determining elemental concentrations of underground formations in which the formation is irradiated with neutrons and a series of radiation measurements are made. The radiation measurements proposed are natural radiation measurement of K, U and Th, activation γ ray measurement of Al and capture γ ray measurement of a series of other elements. The concentration of Al can be measured in absolute terms by the activation γ ray measurement which allows the other measurements to be corrected. This approach requires two neutron sources, a 252 Cf source for Al activation and a pulsed neutron source for capture spectroscopy. U.S. Pat. No. 5,097,123 proposes the use of a broad energy neutron source, AmBe, for the activation and capture spectroscopy measurements. While this reduces the number of sources, there are still three detectors required together with the associated electronics and so a long, complex and expensive tool results.

It is an object of the present invention to provide a method by which the elemental concentrations of a formation can be obtained which obviates or mitigates at least some of the problems outlined above.

It is another object of the present invention to provide a method of determining such elemental concentrations using only capture spectroscopy measurements.

SUMMARY OF THE INVENTION

The present invention provides a method for determining the elemental concentrations in an underground formation by irradiating the formation with neutrons, detecting the γ ray spectrum arising from neutron capture by the formation and analyzing the spectrum to determine relative elemental yields which are converted to elemental concentrations. This method avoids the need for activation measurements or natural radiation measurements and is made possible by applying a factor to modify the determined yield of iron (Fe) from the spectrum to compensate for the absence of measurement of aluminum (Al) and for the absence of potassium (K) when not measured directly.

Apparatus for performing this method can comprise a neutron source, such as a broad energy chemical source, e.g. AmBe, or a pulsed accelerator source, a γ ray detector for detecting capture γ rays and means for analyzing the spectra detected by the detector for determining the elemental concentrations in the formation. This apparatus does not require an activation source nor does it require natural radiation or activation detectors and analysis circuitry. Natural radiation detectors and analysis circuitry can be provided, if desired, to obtain the concentration of potassium in the formation.

BRIEF DESCRIPTION OF THE DRAWINGS

FIGS. 5–11 show elemental composition well logs obtained from cores, prior art methods and from the present invention.

DESCRIPTION OF THE PREFERRED EMBODIMENT OF THE INVENTION

Figure 1:
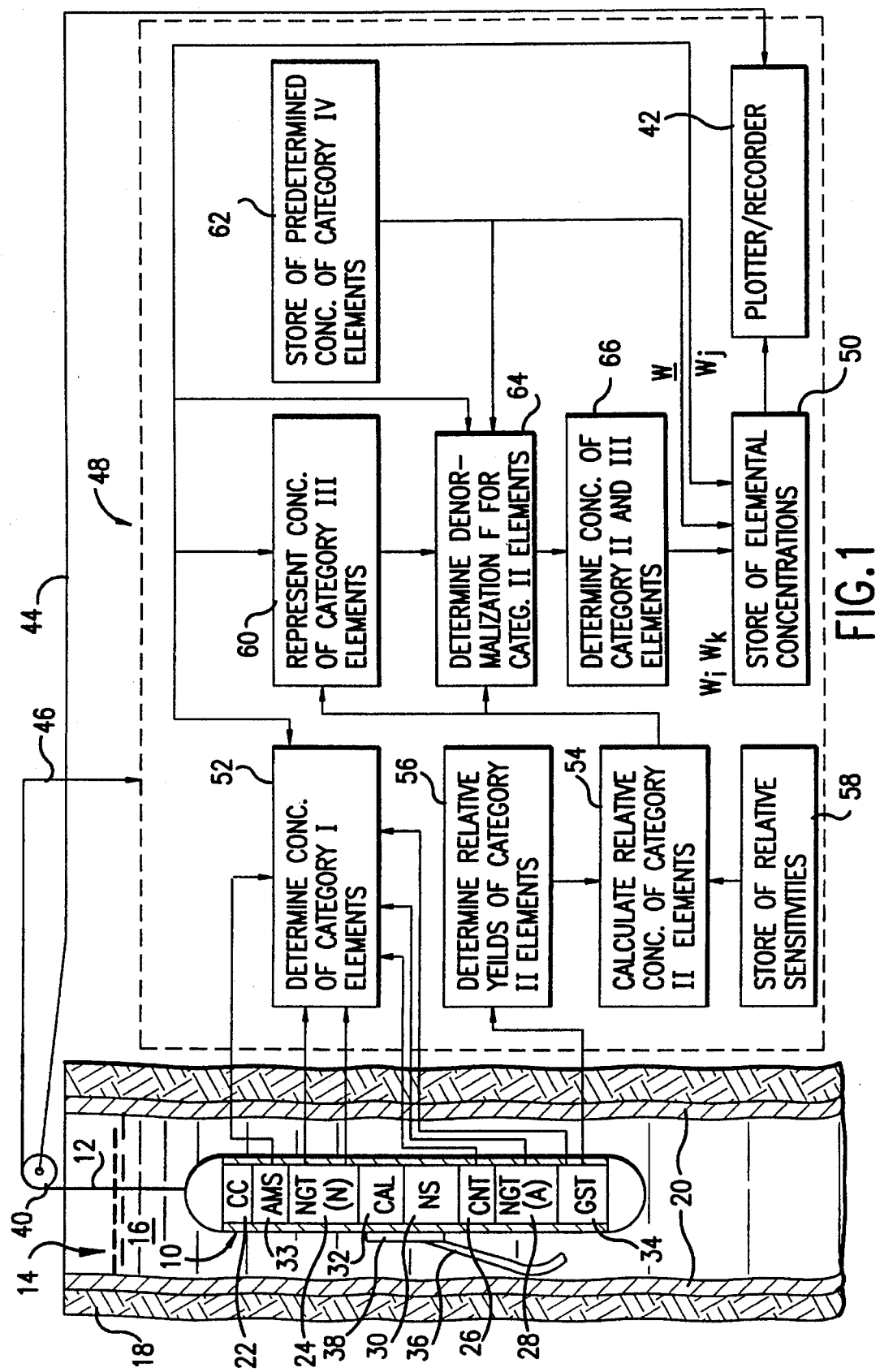
FIGS. 1 and 2 show prior art well logging tools.

FIG. 1 shows a well logging tool of the type described in U.S. Pat. No. 4,810,876. In FIG. 1, a borehole logging tool string 10 is suspended by an armored cable 12 in a borehole 14. The borehole is typically filled with drilling mud 16 and is surrounded by earth formations 18 of interest. The tool string 10 contains a communications cartridge 22 and a plurality of sondes or tools. These tools acquire data for input to the process of determining the absolute or relative concentrations of a plurality of elements, the results of which are used in an overall method for determining the concentrations of substantially all significant elements within the formation 18. The tool string 10 is typically lowered to the bottom of the borehole 14, and then raised at a controlled rate so that data can be acquired as a function of depth in the borehole, thereby permitting the determination of elemental concentrations of a selected group of elements at various depths in the earth formation. While the tool string 10 is moved through the borehole 14, an indication of its depth in the borehole is provided by a depth determining apparatus, generally indicated at 40, which is responsive to the movement of the cable 12 as it is let out and reeled in by a winch (not shown). The depth determining apparatus 40 is connected to a plotter/recorder 42 by a conventional, well-known cable-following device 44.

The tool string 10 includes a first tool system 24, 26, 28, 30, 32, 33 and 34 for use in determining the absolute weight fraction, (i.e., absolute concentration) of aluminum, which falls in a first category of elements in the formation. The first category of elements includes potassium, uranium and thorium. Device 24 is a tool for measuring the natural gamma radiation of potassium, and is also capable of measuring the natural radiation from uranium and thorium. The energy range of interest is from about zero to about 4 MeV, and the tool has a plurality of windows spanning this energy range. Such a tool is more fully described in U.S. Pat. No. 3,976,878, entitled "Natural Gamma Ray Spectrum Analysis, Technique". The first tool system includes a neutron source 30 for activating the aluminum in the formation, a detector 28 for detecting the delayed gamma emission resulting from neutron capture by the aluminum, and tools 26, 33 and 34 which obtain measurements from the borehole and/or formation to be used in providing compensation and correction to the measurements obtained by the tool 28.

A second tool system 34 is provided for determining the relative elemental yields of a second category of elements, by irradiating the formation with neutrons and measuring the resulting gamma ray yields. An embodiment of such a tool is described in U.S. Pat. No. 3,521,064, and in U.S. Pat. No. 4,055,763. U.S. Pat. No. 4,317,993 describes an improvement to the basic tool. For convenience, this second tool system will be referred to as the gamma spectroscopy tool (GST). The macroscopic absorption cross section of the formation is a gross property that is preferably obtained from tool 34, the GST. This cross section is utilized for determining the absolute concentration of aluminum in the formation. Thus, the GST 34 is a part of the first tool system, as well as constituting the second tool system.

Tool 33 is typically of a type generally referred to as an additional or auxiliary measurement sub (AMS), for gathering gross or average properties of the formation or borehole. It measures borehole resistivity and borehole temperature from which the neutron capture cross section of the borehole can be calculated.

The data gathered by the string 10 is initially processed in the communications cartridge 22 and transmitted through the cable 12 by means of communication line 46 into the system processor 48. The system processor is typically located above ground, and operates in real time. The function of the system processor is to determine the elemental concentrations in the formation and store the values as shown at 50. A plot or recording of the elemental concentrations at various depths within the borehole can be made at 42. Also the concentrations of the elements needed to construct the element matrix (E) for the element to mineral transformation, can be obtained from store 50.

Figure 2:
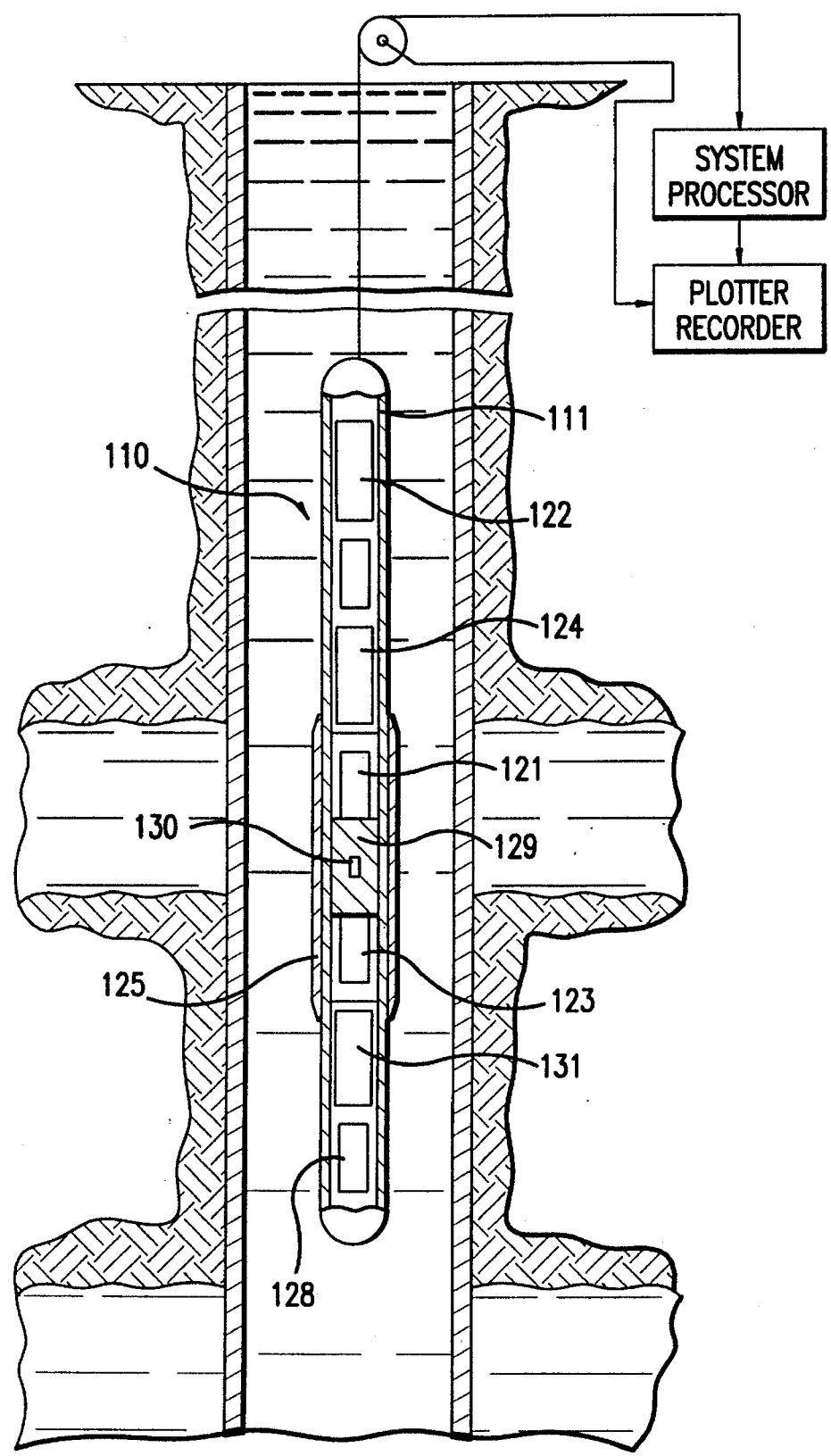

Another prior art tool is described in U.S. Pat. No. 5,097,123 and is shown in FIG. 2. As before, the tool string 110 includes three tool systems successively arranged along the string 110. A communication cartridge 122 is provided at the upper part of the tool string 110 below which is located a first tool system which includes a tool (NGS) for measuring the natural gamma radiation as before. An electronic cartridge 124 designed to acquire or otherwise process data coming from the different tool systems of the whole tool string 110 is situated below the first tool system and a second tool system which is designed to determine the relative elemental yields of elements of interest in the earth formations by irradiating the formation with neutrons and measuring yields of the prompt gamma rays resulting from capture of neutrons by the atoms corresponding to these elements is disposed below the cartridge 124. For convenience, this second tool system will be referred to as the Gamma Spectroscopy Tool (GST). The GST comprises, in this case, a first detector 121, a second detector 123 and a broad energy spectra neutron source 130 disposed between said detectors 121 and 123. Details on the general implementation of the GST tool can be found in U.S. Pat. Nos. 3,521,064, 4,055,763, 4,317,993, or 4,810,876. The broad energy spectra neutron source 130 is a chemical source such as an AmBe source. Alternately, the source 130 can be a broad energy spectra neutron source, such as a PuBe source. The energy of the neutrons emitted by the broad energy spectra source is in a broad range of 2 to 10 Mev.

The outside wall of the housing 111, facing the first capture detector 121 and the second capture detector 123, is surrounded by a cylindrical sleeve 125, made of a material, such as boron, which acts as a neutron absorber, and thus prevents thermal neutrons from activating, through capture or activation phenomenon, atoms in the housing 111 (mainly Fe) which would emit gamma rays able to interfere with gamma rays resulting from the capture of earth formation elements of interest. The neutron source 130 is placed in a shield 129 made of a high density material, such as Hevimet. In another embodiment, the shield 129 comprises a combination of a high density material, for absorbing gamma rays and of a light material, such as hydrogen or beryllium, acting as a neutron moderator.

The tool string 110 includes a third tool system which is designed to determine the absolute aluminum concentration (AACT). The AACT includes the broad energy spectra source 130 (already referred to in connection to the GST), and an AACT detector 128, of the sodium iodide type or preferably of the BGO type, including associated photo multiplier tubes and electronic circuitry (such as a spectrometer), as known in the art, for measuring the number and energy distribution of the delayed gamma rays incident upon the detector 128. The AACT detector 128 and its associated devices is similar to the NGS detector 120. The AACT detector 128 is placed at the bottom end of the housing 111. A chamber 131, between the broad energy spectra neutron source 130 and the AACT detector 128, contains the power supplies and controls (known per se).

Both of the prior art tools described in relation to FIGS. 1 and 2 are capable of measuring the γ ray yield due to thermal neutron capture by the elements comprising the formation and so are suitable for use in the method according to the present invention. The data presented below are obtained with one or other of these prior art tools. However, since the present method does not require either aluminum activation or natural radiation measurements to determine elemental concentrations, a simpler tool such as is described in any of U.S. Pat. No. 3,521,064, U.S. Pat. No. 4,055,763 and U.S. Pat. No. 4,317,993 (all incorporated herein by reference). This tool comprises a tool string with a single tool system including a neutron source which can be either an accelerator source or a broad energy spectra chemical source such as AmBe, a γ ray detector and an appropriate electronics cartridge. While not essential to the present invention, a natural radiation detector can be included so as to provide a measurement of K, such analysis typically being in accordance with the method described in U.S. Pat. No. 3,976,878 (incorporated herein by reference).

The present invention has been developed to estimate actual elemental concentrations of a formation using only the raw capture yields from gamma ray spectroscopy logging tools. This technique is similar to the geochemical oxides closure model which is disclosed in U.S. Pat. No. 5,097,123, Hertzog R. et al. Geochemical logging with spectrometry tools. *Tech. Symp. Soc. Petroleum Engineers,* Dallas, SPW16792 (1987); Schweitzer J. S. et al. Elemental concentrations from Gamma-ray spectroscopy logs. *Nucl. Geophys.* Vol. 2, No. 3, 175–181 (1988); and Grau J. A. and Schweitzer J. S. Elemental concentrations from thermal neutron capture gamma-ray spectra in geological formations. *Nucl. Geophys.* Vol. 3, No. 1, 1–9 (1989).

The foundation of the model is that the oxides of elements detected by the spectrometry tools sum to unity and that one can largely account for unmeasured elements by relying on natural correlations between elements in sedimentary rocks. The present invention adapts the logic embodied in the oxides closure model to a situation where Al and K concentrations are not available, and is referred to as the WALK (Without Al and K) model. This model is applied in the system processor (see description above in relation to FIGS. 1 and 2) and is described in more detail below.

The starting point for the development of the WALK model is the geochemical oxides closure model which is expressed as:

$$F \left\{ \sum_i X_i \frac{Y_i}{S_i} \right\} + X_K W_K + X_{Al} W_{Al} = 1, \text{ and} \quad (1)$$

$$W_i = F \frac{Y_i}{S_i} \quad (2)$$

where $X_i$ is the oxide association factor to convert element i to its common oxide or oxide plus associated elements, $S_i$ is the sensitivity of element i, $W_i$ is the weight fraction of element i, and $Y_i$ is the relative yield of element i corrected for potassium interference and for the contribution of Al gamma rays to the Fe yield and subjected to a positivity constraint. F is the normalization factor derived level-by-level. It compensates for the fact that Cl and H are eliminated from the analysis and that the yields are divided by their sensitivities.

The goal of the WALK model is to similarly estimate elemental concentrations as:

$$W_i = F_{WALK} \frac{C_i}{S_i}, \quad (3)$$

where $C_i$ now represents raw capture yields not corrected for potassium interference or aluminum contributing to the iron yield, and $F_{WALK}$ is the new normalization factor. The general approach is the same as the oxides model, which is to assume that the sum of the elemental oxides and associated elements is proportional to one:

$$F_{WALK} \left[ X_{Si} \frac{C_{Si}}{S_{Si}} + X_{Ca} \frac{C_{Ca}}{S_{Ca}} + X_S \frac{C_S}{S_S} + X_{Ti} \frac{C_{Ti}}{S_{Ti}} + X_{Gd} \frac{C_{Gd}}{S_{Gd}} + X_{FeAl} \frac{C_{Fe}}{S_{Fe}} \right] = 1, \quad (4)$$

The main difference is that with aluminum and potassium missing from the suite of measurements, less of the rock is measured, so more of the rock goes into the associated elements. The approach taken is to empirically compensate for the missing elements, Al and K, by capitalizing on their common association with Fe. Hence, the designation of a new oxide association factor, $X_{FeAl}$. Clearly, the value for $X_{FeAl}$ will be considerably higher than the current oxide normalization factor for Fe which is 2.075. An additional complication is that the spectral Fe yield contains $\gamma$ rays produced from Al which cannot be removed in WALK processing since the Al concentration is an unknown. This effect by itself would decrease the Fe oxide factor, but it is a considerably weaker factor. When a natural radiation measurement is present, the amount of K can be determined and this concentration can be incorporated when determining the elemental concentrations in the formation. In this case the oxide association factor for Fe need only compensate for the absence of a direct measurement of Al and the model is adjusted accordingly.

Another way of expressing the WALK model is to assume that the weight fraction of an oxide of a major element is proportional to the ratio of that oxide to the sum of the oxides detected by the spectrometer, e.g., $$SiO_2 \propto \frac{X_{Si} \frac{C_{Si}}{S_{Si}}}{X_{Si} \frac{C_{Si}}{S_{Si}} + X_{Ca} \frac{C_{Ca}}{S_{Ca}} + X_S \frac{C_S}{S_S} + X_{Ti} \frac{C_{Ti}}{S_{Ti}} + X_{Gd} \frac{C_{Gd}}{S_{Gd}} + X_{FeAl} \frac{C_{Fe}}{S_{Fe}}}, \quad (5)$$

and the factor of proportionality should be equal to $F_{WALK}$.

Figure 3A:
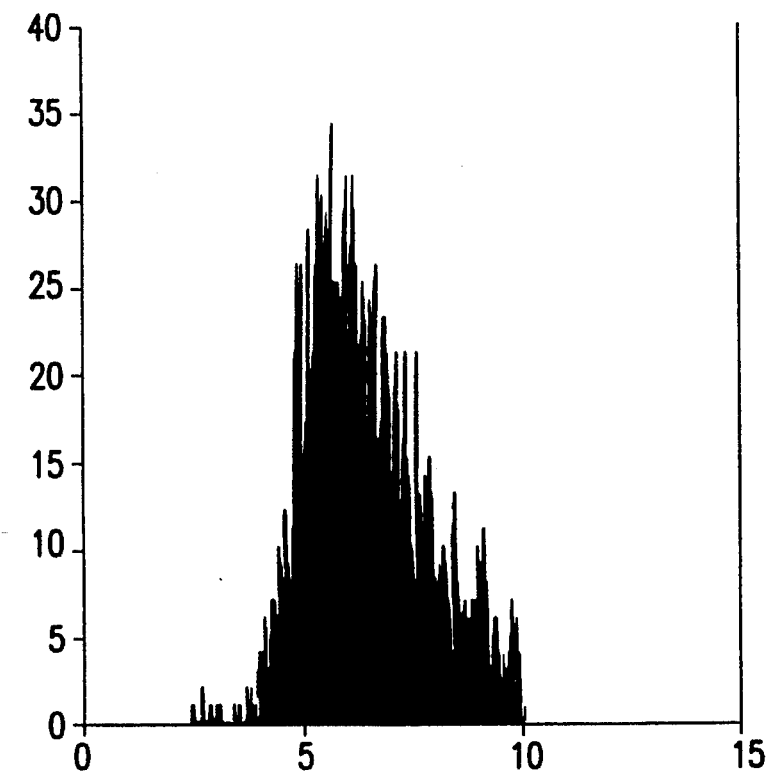
FIG. 3 shows a histogram of values obtained for $X_{FeAl}$ from field data.
Figure 3B:
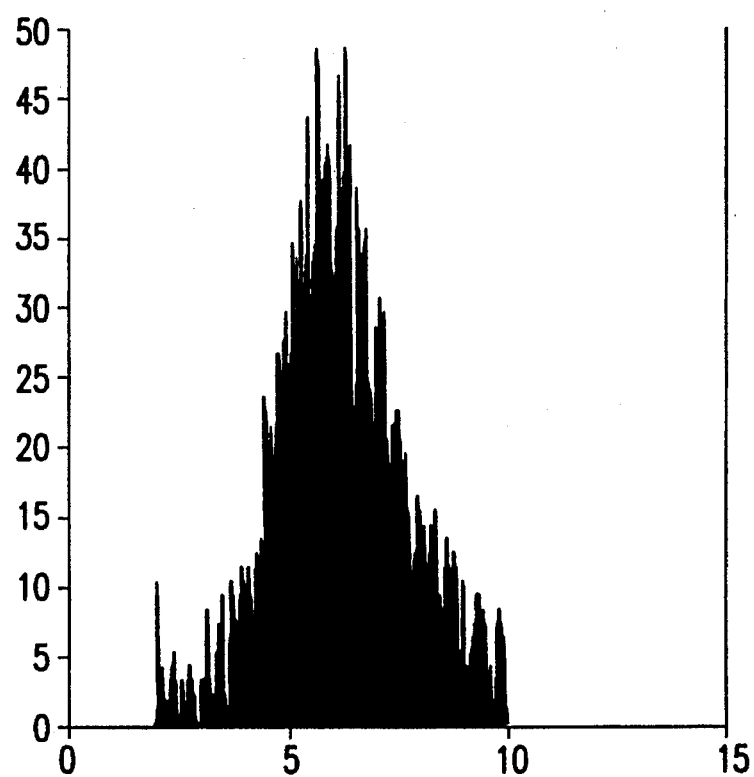

Two approaches are used to determine the value for $X_{FeAl}$. The first is to use field test results. In this approach, the F derived in equation (1) from field data is substituted for $F_{WALK}$ in equation (4), thus making it possible to solve for $X_{FeAl}$. Histograms of the $X_{FeAl}$ values derived from field data are presented in FIG. 3. These data suggest a value of about 6 for $X_{FeAl}$, compared to the iron oxide association value of 2.075 published for the oxides closure model.

Figure 4:
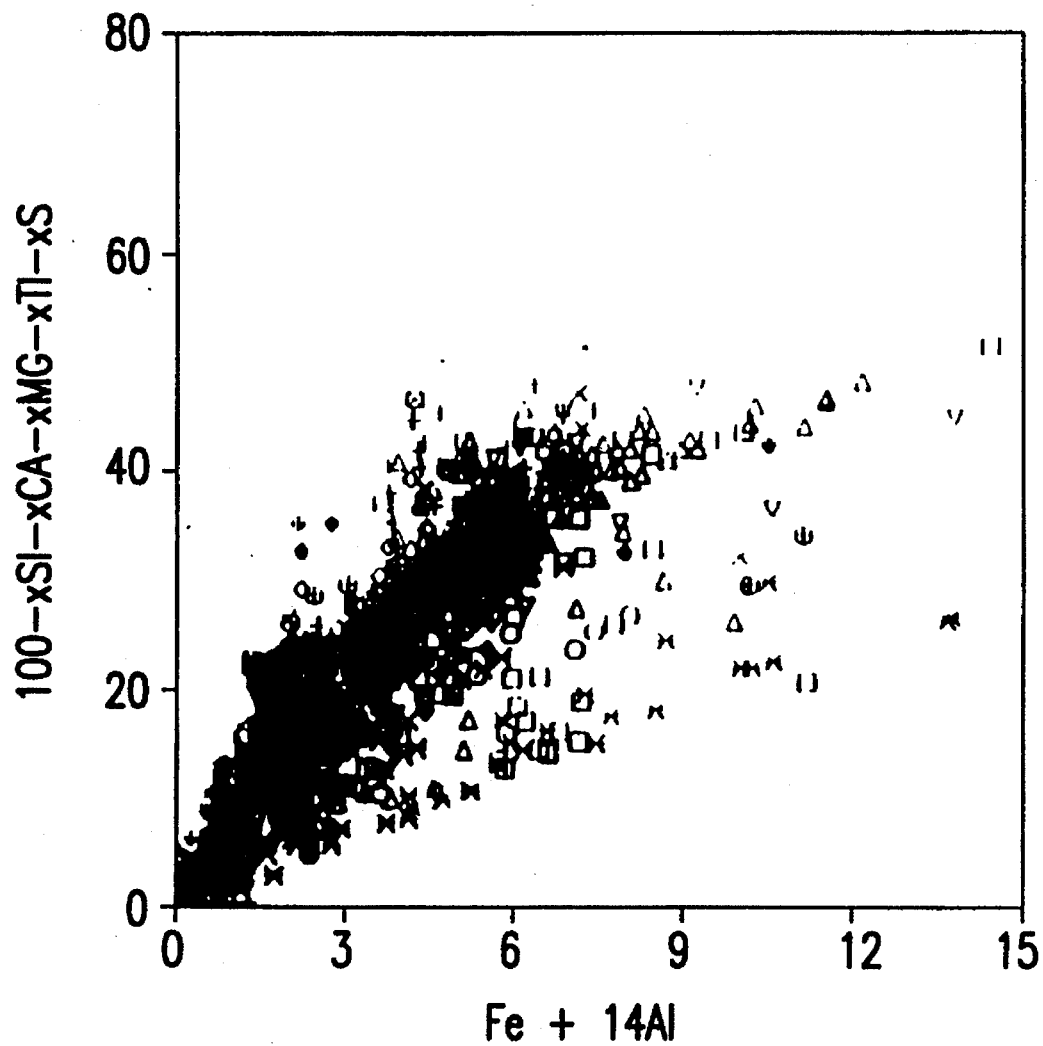
FIG. 4 shows a plot of Fe+0.14 Al (wt %) (y axis) against $100-X_{Si}Si-X_{Ca}Ca-X_{Mg}Mg-X_{Ti}Ti-X_S S$ (x axis)

The second approach is to determine an optimal value for $X_{FeAl}$ using core data. The goal is to find a value which causes the oxides, or pseudo-oxides represented in equation (4) to represent the whole rock. FIG. 4 demonstrates the approach taken to determine this value from 1,145 core samples. The y axis is Fe+0.14 Al (wt %) which closely represents the quantity measured as iron by elemental capture spectroscopy. The x axis is $100-X_{Si}Si-X_{Ca}Ca-X_{Mg}Mg-X_{Ti}Ti-X_S S$ where the $X_i$ values are the oxide association factors described above and Si, Ca, Mg, Ti, and S are elemental concentrations in weight percent. The x axis then represents the portion of the rock, exclusive of the iron yield, which is not accounted for by the capture gamma ray spectrum. $X_{FeAl}$ is the slope of the data. Over 90% of the core data fall between $X_{FeAl}$ values of 5 and 7, which is in accordance with the values derived by calibrating the answers to the answers interpreted from field data. A value of 5.8 was selected for use in processing the elemental capture spectroscopy field test data. This value can be optimized regionally to compensate for missing elements, such as Al, K, Na, or Mg.

The next step is the determination of $F_{WALK}$. This is the level-by-level normalization factor used to bring the sum of the oxides to unity. The value of $F_{WALK}$ generally ranges between about 1.2 and 5, and it is quite close to the value of F in equation 1.

The WALK processing technique has been applied to elemental capture spectroscopy data from seven field test wells for which core data are also available. For each well, elemental concentrations were derived through the geochemical oxides closure model using the full data set.

The results of the elemental capture spectroscopy WALK processing on four wells are presented as the solid lines in FIGS. 5 to 11. For comparison with the current state of the art, the results of the prior art processing are presented as dashed lines. Each figure also includes elemental concentrations measured on core samples (solid dots).

The prompt capture yield for iron actually contains gamma rays from both Fe and Al. Consequently, the Fe concentration determined by WALK processing is equal to [Fe]+0.14 [Al]. Accordingly, the data plotted for comparison are dry weight of Fe+0.14 dry weight Al, and the core points plotted for comparison are Fe+0.14 Al in view of the absence of a measurement of Al from the method according to the present invention. Where environmental conditions permit, the $P_e$ curve is used in conjunction with the other data to derive a magnesium concentration. The same logic can be applied to the WALK processing but has not been done here. Therefore, where there are significant concentrations of magnesium in the field dam, there will be differences between the results obtained by the prior art method and the present invention. This is apparent in the logs of FIGS. 7 and 11.

In FIGS. 5 to 7, the only significant discrepancies between the two sets of data occur below 1620' where the formation contains significant dolomite. As mentioned above, the prior art processing includes a $P_e$-derived magnesium concentration and the elemental capture spectroscopy WALK processing does not. Accordingly, the elemental capture spectroscopy WALK processing indicates 30–35 wt % calcium whereas the prior art log shows less than 20 wt %.

FIGS. 10 and 11 present significant differences between the two data sets in the 490–520' depth interval where the WALK iron and silicon are lower than the prior art logs. This depth zone contains up to 60 wt % glauconite, a clay mineral with an iron content of over 15 wt %, which is twice as high as any other common clay mineral. In contrast, the aluminum content of glauconite is around 4 wt % which is about one third that of common clay minerals. Clearly, the glauconite composition violates the trend used in selecting the $X_{FeAl}$ oxide association factor. This is demonstrated by the core data in FIG. 5 where the iron-rich samples (region X) establish a trend with a slope of about 2 instead of 6. However, the rest of the samples from this well follow the main trend, and through the rest of the well the prior art and elemental capture spectroscopy WALK results are quite similar.

The example presented in FIG. 12, is from a well which is composed primarily of dolomite and anhydrite. In this well, the magnesium content is fairly constant at values between 10 and 13 wt %. In pure dolomite, the prior art method with a magnesium estimation should see 23% calcium and 13% magnesium. Since a magnesium derivation is not present in the WALK processing, the magnesium is essentially distributed among the other elements, as is illustrated by the overestimation of all elements except calcium in FIG. 12.

I claim:

1. A method for determining the elemental concentrations in a formation surrounding a borehole, comprising:
    a) positioning a tool in the borehole adjacent to a formation to be investigated
    b) irradiating the formation with neutrons from the tool;
    c) detecting γ rays resulting from neutron capture by the elements in the formation so as to obtain a spectrum;
    d) determining the contribution of each element in the formation to the spectrum;
    e) determining a factor for modifying the contribution of iron to the spectrum γ ray yields to compensate for a lack of aluminum measurement; and
    f) using the spectrum and the factor to determine elemental concentrations in the formation.

2. A method as claimed in claim 1, wherein the factor is obtained from core data derived from samples of formation material analyzed for elemental composition.

3. A method as claimed in claim 1, wherein the factor is obtained from previous radiation measurements of underground formations.

4. A method as claimed in claim 1, wherein the step of using the spectrum and the factor includes determination of a normalization factor so as to cause the elemental concentrations to sum to unity.

5. A method as claimed in claim 4, wherein the elemental concentrations are determined using the formula:

$$F_{WALK}\left[X_{Si}\frac{C_{Si}}{S_{Si}} + X_{Ca}\frac{C_{Ca}}{S_{Ca}} + X_S\frac{C_S}{S_S} + X_{Ti}\frac{C_{Ti}}{S_{Ti}} + X_{Gd}\frac{C_{Gd}}{S_{Gd}} + X_{FeAl}\frac{C_{Fe}}{S_{Fe}}\right] = 1$$

in which X is the oxide association factor for an element, S is the sensitivity of an element to irradiation, C is the γ ray yield for a given element, $X_{FeAl}$ is a factor for modifying the contribution of iron to the spectrum γ ray yields to compensate for a lack of aluminum measurement and $F_{WALK}$ is the normalization factor so as to cause the elemental concentrations to sum to unity.

6. A method as claimed in claim 5, wherein $X_{FeAl}$ has a value of from about 5 to about 7.

7. A method as claimed in claim 6, wherein $X_{FeAl}$ has a value of about 6.

8. A method as claimed in claim 1, wherein the step of detecting γ rays is performed in the absence of any measurement of natural radiation.

9. A method as claimed in claim 8, wherein the factor for modifying the contribution of iron to the spectrum γ ray yields to compensate for a lack of aluminum measurement also compensates for a lack of potassium measurement.

10. A method as claimed in claim 1, wherein the step of detecting γ rays is performed in the absence of any measurement of radiation arising from activation of elements in the formation.

11. A method as claimed in claim 1, comprising the further steps of:
    measuring natural radiation from the formation and determining the concentration of potassium in the formation therefrom; and
    using the determined concentration of potassium, the spectrum and the factor to determine elemental concentrations in the formation.

12. A method for determining the concentrations of the elements Si, Ca, S, Ti, Gd and Fe in a formation surrounding a borehole, comprising:
    a) positioning a tool in the borehole adjacent a formation to be investigated
    b) irradiating the formation with neutrons from the tool;
    c) detecting γ rays resulting from neutron capture by said elements in the formation so as to obtain a spectrum;
    d) determining the contribution of each element in the formation to the spectrum;
    e) determining a factor for modifying the contribution of iron to the spectrum γ ray yields to compensate for a lack of aluminum measurement; and
    f) using the spectrum and the factor to determine the concentrations of said elements in the formation.

13. A method as claimed in claim 12, wherein the elemental concentrations are determined using the formula:

$$F_{WALK}\left[X_{Si}\frac{C_{Si}}{S_{Si}} + X_{Ca}\frac{C_{Ca}}{S_{Ca}} + X_S\frac{C_S}{S_S} + X_{Ti}\frac{C_{Ti}}{S_{Ti}} + X_{Gd}\frac{C_{Gd}}{S_{Gd}} + X_{FeAl}\frac{C_{Fe}}{S_{Fe}}\right] = 1$$

in which X is the oxide association factor for an element, S is the sensitivity of an element to irradiation, C is the γ ray yield for a given element, $X_{FeAl}$ is a factor for modifying the contribution of iron to the spectrum γ ray yields to compensate for a lack of aluminum measurement and $F_{WALK}$ is the normalization factor so as to cause the elemental concentrations to sum to unity.

14. A method as claimed in claim 13, wherein $X_{FeAl}$ has a value of from about 5 to about 7.

15. A method as claimed in claim 14, wherein $X_{FeAl}$ has a value of about 6.

16. Apparatus for determining the elemental concentrations in a formation surrounding a borehole, comprising:
   a) a tool body for positioning in the borehole adjacent a formation to be investigated
   b) a neutron source in said tool body for irradiating the formation;
   c) at least one γ ray detector in said tool body for detecting γ rays resulting from neutron capture by the elements in the formation so as to obtain a spectrum; and
   d) means for using the spectrum and a predetermined factor modifying the contribution of iron to the spectrum γ ray yields to compensate for a lack of aluminum measurement to determine elemental concentrations in the formation.

17. Apparatus as claimed in claim 16, wherein said tool body does not include any detectors for natural radiation or radiation resulting from activation of elements in the formation.

18. Apparatus as claimed in claim 16, wherein the neutron source comprises an accelerator source.

19. Apparatus as claimed in claim 16, wherein the neutron source comprises a chemical source.

20. Apparatus as claimed in claim 19, wherein the chemical source comprises an AmBe source.

21. Apparatus as claimed in claim 16, wherein the means for using the spectrum and a predetermined factor modifying the contribution of iron to the spectrum γ ray yields to compensate for a lack of aluminum measurement to determine elemental concentrations in the formation determines the concentrations of Si, Ca, S, Ti, Gd and Fe in the formation.

22. Apparatus as claimed in claim 16, wherein the factor for modifying the contribution of iron to the spectrum γ ray yields to compensate for a lack of aluminum measurement also compensates for a lack of potassium measurement.

23. Apparatus as claimed in claim 16, further comprising a natural radiation detector and means for determining the concentration of potassium from radiation detected thereby, wherein the means for using the spectrum and a predetermined factor modifying the contribution of iron to the spectrum γ ray yields to compensate for a lack of aluminum measurement to determine elemental concentrations in the formation also uses the determined concentration of potassium.

* * * * *